United States Patent
Naimark et al.

(12) 
(10) Patent No.: US 6,721,744 B1
(45) Date of Patent: Apr. 13, 2004

(54) NORMALIZING A MEASURE OF THE LEVEL OF CURRENT INTEREST OF AN ITEM ACCESSIBLE VIA A NETWORK

(75) Inventors: Michael Naimark, San Francisco, CA (US); Aviv Bergman, Palo Alto, CA (US); Emily Weil, New York, NY (US); Ignazio Moresco, Brooklyn, NY (US); Baldo Faieta, San Francisco, CA (US)

(73) Assignee: Interval Research Corporation, Palo Alto, CA (US)

( * ) Notice: Subject to any disclaimer, the term of this patent is extended or adjusted under 35 U.S.C. 154(b) by 456 days.

(21) Appl. No.: 09/658,346

(22) Filed: Sep. 7, 2000

Related U.S. Application Data
(60) Provisional application No. 60/178,627, filed on Jan. 28, 2000.

(51) Int. Cl.[7] .............................. G06F 17/30
(52) U.S. Cl. ...................... 707/10; 707/102
(58) Field of Search .................. 707/2–5, 10, 102; 709/224, 218

(56) References Cited

U.S. PATENT DOCUMENTS

| | | | | |
|---|---|---|---|---|
| 6,078,916 A | * | 6/2000 | Culliss ........................... | 707/5 |
| 6,098,064 A | * | 8/2000 | Pirolli et al. ................... | 707/5 |
| 6,104,989 A | * | 8/2000 | Kanevsky et al. ............. | 707/2 |
| 6,182,067 B1 | * | 1/2001 | Presnell et al. ................ | 707/5 |
| 6,208,989 B1 | * | 3/2001 | Dockter et al. ................ | 707/5 |
| 6,360,261 B1 | * | 3/2002 | Boyd et al. ................... | 709/224 |
| 6,385,619 B1 | * | 5/2002 | Eichstaedt et al. ............. | 707/5 |
| 6,460,036 B1 | * | 10/2002 | Herz ............................. | 707/2 |

OTHER PUBLICATIONS

Dwi H. Widyantoro, Thomas R. Ioerger, John Yen Titled "An Adaptive Algorithm for Learning Changes in User Interests" copyright 1999 ACM 1–58113–146–1/99/0010.*
Ingo Schwab, Wolfgang Pohl, and Ivan Koychev Titled "Learning to Recommend from Positive Evidence" copyright ACM 2000 1–58113–134–8/00/1.*
Guernsey, Lisa, "Mining the 'Deep Web' with Specialized Drills", Jan. 25, 2001, The New York Times.
eNow–Company Background, http://www.enow.com/html/compl.html, Feb. 7, 2001.
"About Upoc", http://www.upoc.com/about.jsp; Feb. 7, 2001.

* cited by examiner

*Primary Examiner*—Diane D. Mizrahi
(74) *Attorney, Agent, or Firm*—Van Pelt & Yi LLP

(57) ABSTRACT

Normalizing a measure of the level of current interest of an item that is based on indications of interest received from one or more users of a network via which the item is accessible is disclosed. In one embodiment, an intensity value is determined for each successive indication of interest received with respect to an item. At the time each successive indication of interest with respect to the item is received, an intensity rank based at least in part on the intensity value of the received indication is calculated. The calculated intensity rank is multiplied by a normalization factor to determine a normalized intensity rank.

6 Claims, 14 Drawing Sheets

| Field | Ref |
|---|---|
| Alert_id | 502 |
| Timestamp | 504 |
| Alerter_id | 506 |
| URL | 508 |
| Interest selection | 510 |
| Caption | 512 |
| Alert intensity | 514 |
| Last_time | 516 |
| Last_rank | 518 |
| Last_weight | 520 |
| Last_intensity_sum | 522 |
| Last_normal_time | 524 |

NORMALIZING A MEASURE OF THE LEVEL OF CURRENT INTEREST OF AN ITEM ACCESSIBLE VIA A NETWORK

CROSS REFERENCE TO RELATED APPLICATIONS

This application claims priority to U.S. Provisional Patent Application No. 60/178,627 entitled "Alerting Users To Web Sites Of Current Interest And Handling Large Increases In User Traffic" filed Jan. 28, 2000 which is incorporated herein by reference for all purposes.

This application is related to U.S. patent application Ser. No. 09/656,638 entitled "Alerting Users To Items Of Current Interest" filed concurrently herewith, which is incorporated herein by reference for all purposes; and U.S. patent application Ser. No. 09/656,518, now U.S. Pat. No. 6,556,989, issued Apr. 29, 2003, entitled "Quantifying The Level Of Interest Of An Item Of Current Interest" filed concurrently herewith, which is incorporated herein by reference for all purposes.

FIELD OF THE INVENTION

The present invention relates generally to communications and computer networks. More specifically, alerting users to dynamic content accessible via a communications or computer network that is of interest at the time of the alert is is closed.

BACKGROUND OF THE INVENTION

The use of the Internet, and in particular the World Wide Web, and other communication and computer networks has grown dramatically in recent years. The emergence of technologies for broader bandwidth communications, better compression technology, and new and less expensive digital recording and imaging technology, have all contributed to explosive growth in the volume and diversity of content available via communication and/or computer networks, such as the World Wide Web.

However, this proliferation of content, such as audio, image, and video content, presents certain challenges from the perspective of users seeking content of current interest. First, the shear volume of content available makes it difficult for users to find the content in which they are most interested in accessing at any given time. Apart from having to sort through the enormous volume of content available, much of the content of potentially greatest interest, at least to many users, is dynamic. At certain times, a file or other electronic resource may be of great interest while at other times, or perhaps even most of the time, it is not of great interest or not interesting at all.

For example, thousands of and perhaps in excess of a hundred thousand web cameras, or "webcams", are in use. Webcams are cameras used to provide images of a target of interest via a site on the World Wide Web. Images are updated in varying manners and at varying intervals, depending on the site. A webcam might be used, for example, to provide images of a watering hole in Africa. Typically, users would access a website associated with the webcam to view activity at the watering hole. However, there would be many periods during which nothing of particular interest (e.g., no animals, etc.) would be happening at the watering hole. Conversely, there would be occasional periods when activity of great interest would be occurring, such as the presence of a rare or endangered animal at the watering hole. Users would have no way of knowing when such activity would be occurring, and might miss the most interesting images if they did not happen to check the website at the right time. The same problems arise with respect to files or other electronic resources other than webcam content provided via the World Wide Web, including other media such as audio.

As a result, there is a need for a way to alert users to web content or other electronic resources available via a communications or computer network that are of interest at a particular time. To meet this latter need, there is a need to provide a way to become aware that dynamic web content or an electronic resource other than web content is of interest at a given time, and to quantify the degree or level of current interest. In addition, there is a need to consider the interests of a user when determining which web content or other electronic resources likely will be of the greatest interest to the user.

There is also a need to ensure that interested users receive alerts with respect to web content or other electronic resources that are of interest only to a relatively small community of users, or that are of interest on only relatively rare or infrequent occasions. There is a risk, otherwise, that indications of current interest regarding such files and other electronic resources would be masked by more voluminous or frequent activity with respect to more widely popular or pervasive resources or types of resources (such as pornography sites on the World Wide Web).

SUMMARY OF THE INVENTION

Accordingly, alerting users of items of current interest is disclosed. The level of current interest of a particular file or other electronic resource is determined based on indications received from alerting users. One or more users receive an alert that the item is of current interest. Normalization of the level of current interest of a file or other resource, such as to adjust for items of current interest to a small community or for items of current interest only infrequently, also is described.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. Several inventive embodiments of the present invention are described below.

Normalizing a measure of the level of current interest of an item that is based on indications of interest received from one or more users of a network via which the item is accessible is disclosed. In one embodiment, an intensity value is determined for each successive indication of interest received with respect to an item. At the time each successive indication of interest with respect to the item is received, an intensity rank based at least in part on the intensity value of the received indication is calculated. The calculated intensity rank is multiplied by a normalization factor to determine a normalized intensity rank.

In one embodiment, a computer is configured to determine an intensity value for each successive indication of interest received with respect to an item; calculate at the time each successive indication of interest with respect to the item is received an intensity rank based at least in part on the intensity value of the received indication; and multiply the calculated intensity rank by a normalization factor to determine a normalized intensity rank. A database, associated with the computer, is configured to store data relating to the item.

In one embodiment, a computer program product for normalizing a measure of the level of current interest of an item that is based on indications of interest received from one or more users of a network via which the item is accessible comprises computer instructions for determining for each successive indication of interest received with respect to the item an intensity value; calculating at the time each successive indication of interest with respect to the item is received an intensity rank based at least in part on the intensity value of the received indication; and multiplying the calculated intensity rank by a normalization factor to determine a normalized intensity rank.

These and other features and advantages of the present invention will be presented in more detail in the following detailed description and the accompanying figures, which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Figure 1:
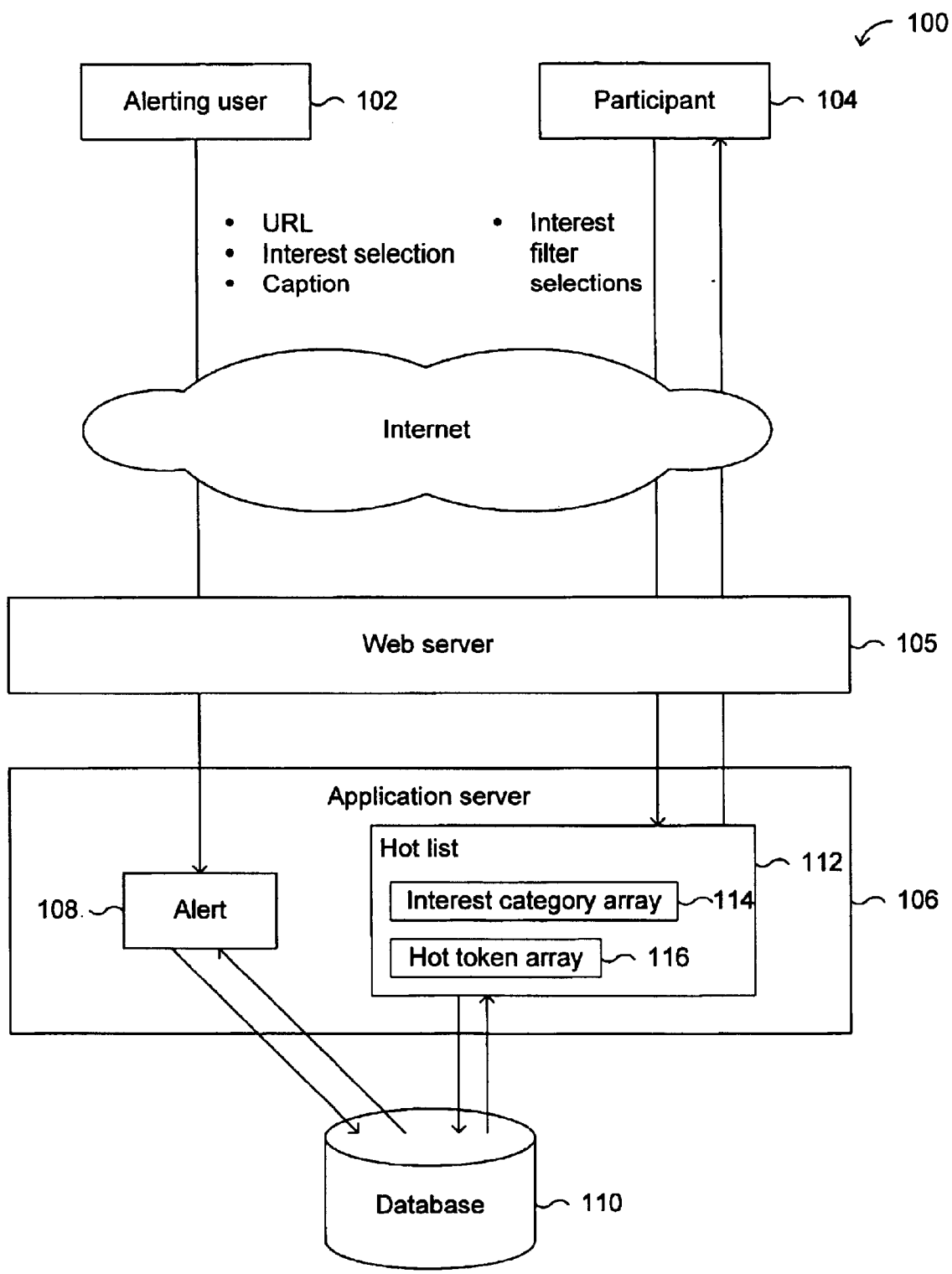
FIG. 1 is a schematic diagram illustrating a system used in one embodiment to alert users to dynamic content of interest at the time of the alert (also referred to herein as an "item of current interest").

FIG. 1 is a schematic diagram illustrating a system used in one embodiment to alert users to dynamic content of interest at the time of the alert (also referred to herein as an "item of current interest"). The system 100 includes at least one alerting user 102 who accesses dynamic content associated with a uniform resource locator (URL), determines the content is of current interest, and sends an alert indicating that the URL is of current interest, as described more fully below. The system 100 also includes at least one participant 104. In one embodiment, participant 104 provides an indication of the participant's interests and receives a list of URLs providing the location of dynamic content, such as web content on the World Wide Web, that may be of interest to the participant at the time of the alert, as described more fully below. Both the alerting user 102 and the participant 104 are connected to a web server 105 via the Internet. Web server 105 is a computer system configured to present web pages and other web browser readable file, and to receive data from users, via the World Wide Web. Web server 105 is connected to an application server 106 and is configured to provide data to and receive data and instructions from application server 106. Application server 106 is configured to perform the application logic functions described more fully below. In one embodiment, the functions performed by the application server, as described more fully below, are divided among two or more computers so as to optimize the distribution of work load among the computers and to minimize the time the system takes to respond to inputs and queries from users.

When an alert has been received and is being processed, as described more fully below, the application server 106 comprises an alert software object 108 used to store data relating to and perform certain processing with respect to an alert, as described more fully below. The alert software object 108 uses data provided in an alert sent by alerting user 102, along with data retrieved from database 110 associated with the application server 106, to process the alert. Certain of the data that results from the processing performed by alert software object 108 is then stored in database 110. In one embodiment, database 110 is stored in memory in application server 106. In one embodiment, database 110 is stored in a separate structure, such as a database server, connected, either directly or through a communication link, with application server 106.

In one embodiment, when a request from a participant for a list of URLs for items of current interest is received, the application server 106 comprises a hot list software object 112 used to store certain data concerning and perform certain operations with respect to the request from the participant and the response thereto. In one embodiment, the hot list object 112 comprises an interest category array 114. In one embodiment, the interest category array 114 is comprised of one or more interest category objects, each of which stores data relating to one interest category identified in the participant's request as being of interest to the participant. In one embodiment, the hot list object 112 comprises a hot token array 116. The hot token array 116 is comprised of a hot token object for each URL of current interest in the database for the category or categories indicated in the participant's request.

As indicated in FIG. 1, an alert sent by an alerting user includes, in one embodiment, at least the URL of the web content considered by the alerting user to be of current interest. In one embodiment an alert may also include an interest selection, meaning a category or subject area to which the alerting user believes the web content relates, and/or a caption in which the alerting user may provide text indicating what the alerting user believes to be of current interest in the web content.

Figure 2A:
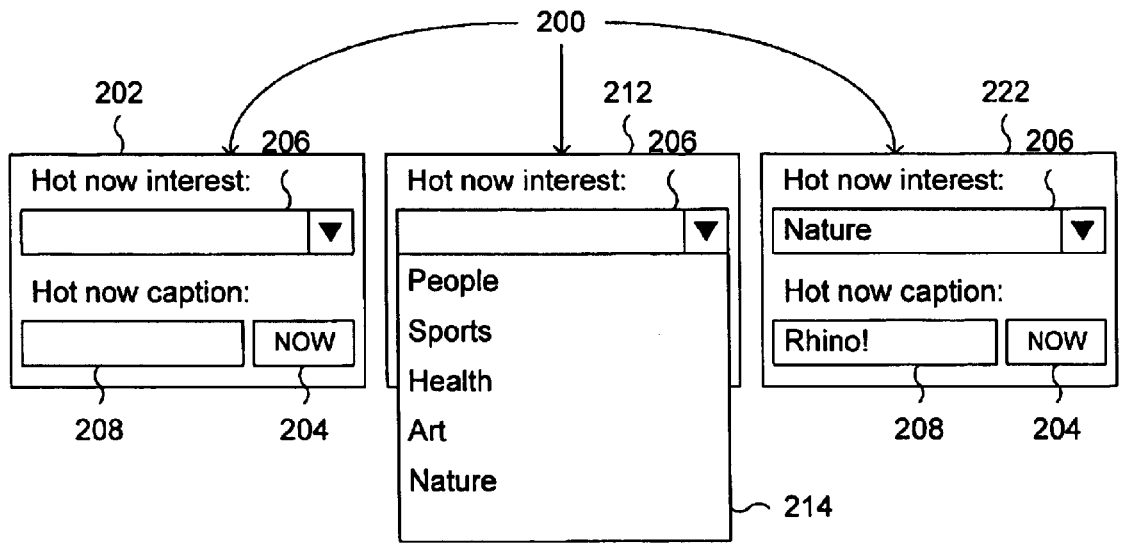
FIG. 2A is a series of three screen shots showing three different states of an alert submission display 200 used in one embodiment.

FIG. 2A is a series of three screen shots showing three different states of an alert submission display 200 used in one embodiment. One view is comprised of blank alert submission display 202. Blank alert submission display 202 includes a submission button 204 used to submit an alert with respect to the URL of the web content currently being accessed by the alerting user. Blank alert submission display 202 also includes an interest category selection area 206. In one embodiment, as illustrated in FIG. 2A, the interest category selection area 206 is configured as a pull down menu activated by selecting the downward arrow on the right side of interest category selection area 206. Blank alert submission display 202 also includes a caption area 208 in which an alerting user may enter text associated with the alert, such as text indicating why the alerting user believes the URL to be of current interest. As shown in interest category selection display 212, when the downward arrow button on the right side of interest category selection area 206 is selected, a pull down menu 214 is presented, and an alerting user may select one of the interest categories listed in the pull down menu 214 in the manner well known in the art. As shown in the completed alert submission display 222 of FIG. 2A, the interest category selected by the alerting user is shown in the interest category selection area 206. In the example shown in FIG. 2A, the category selected is "NATURE". In addition, the caption entered by the alerting user, the comment "rhino" in the example shown in FIG. 2A, appears in the caption area 208 of the alert submission display. As noted above, the alerting party posts the alert to the application server via the Internet and the web server by selecting the submission button 204.

Figure 2B:
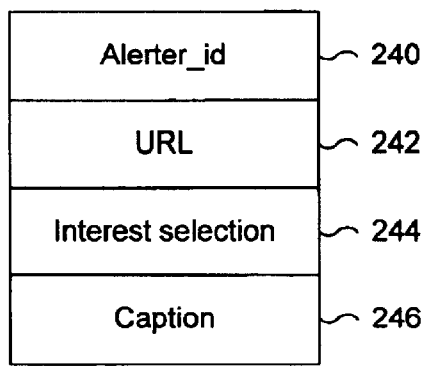
FIG. 2B is an illustration of the data structure used in one embodiment for alerts submitted by an alerting user.

FIG. 2B is an illustration of the data structure used in one embodiment for alerts submitted by an alerting user. The alert includes an ALERTER_ID field 240 in which data identifying the alerting user is provided. The alert also includes a URL field 242 in which the URL of the web content or other electronic resource being accessed by the alerting user when the alert was sent is stored. The alert also includes an INTEREST SELECTION field 244 in which the interest category selected by the alerting user, if any, is provided. Finally, the alert includes a CAPTION field 246 in which the caption entered by the alerting user, if any, is provided.

Figure 3:
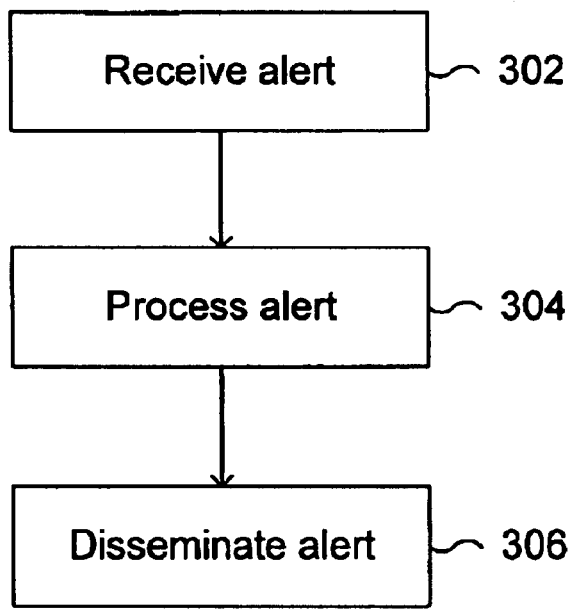
FIG. 3 is a flow chart illustrating a process used in one embodiment to alert users of items of current interest.

FIG. 3 is a flow chart illustrating a process used in one embodiment to alert users of items of current interest. The process begins in step 302 in which an alert indicating that an item is of current interest is received. Next, in step 304, the alert is processed. Finally, in step 306, the alert is disseminated to one or more participants, as described more fully below.

Figure 4:
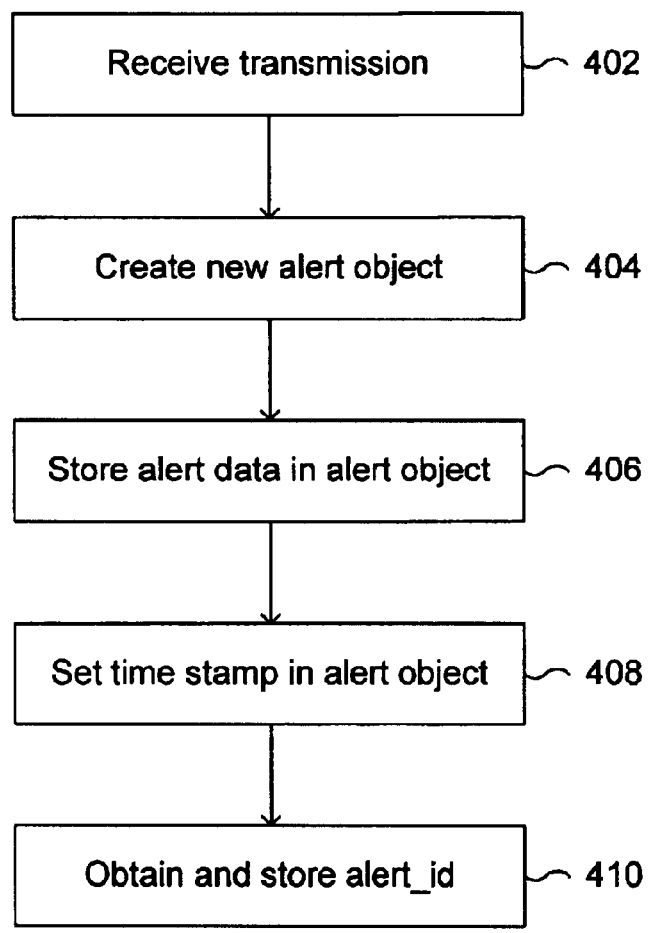
FIG. 4 is a flow chart illustrating a process used in one embodiment to receive an alert, as in step 302 of FIG. 3.

FIG. 4 is a flow chart illustrating a process used in one embodiment to receive an alert, as in step 302 of FIG. 3. The process begins with step 402 in which a transmission comprising an alert is received from an alerting user. As noted above, in one embodiment an alert includes at least the URL of the web content being accessed by the alerting user at the time the alert was sent. In one embodiment, as described above, the alert also includes data indicating the identity of the alerting user. In addition, as noted above, the alert may include, at the option of the alerting user, an interest selection and/or a caption for the alert. The process shown in FIG. 4 continues with step 404 in which a new alert software object is created at the application server, such as application server 106 of FIG. 1. Next, in step 406, the data provided in the alert is stored in the alert object. In step 408, a time stamp indicating the time when the alert was received is stored in the alert object. Finally, in step 410, an ALERT_ID, which uniquely identifies the alert and distinguishes the alert and its associated object from other alerts and their associated objects, is obtained and stored in the alert object.

Figure 5:
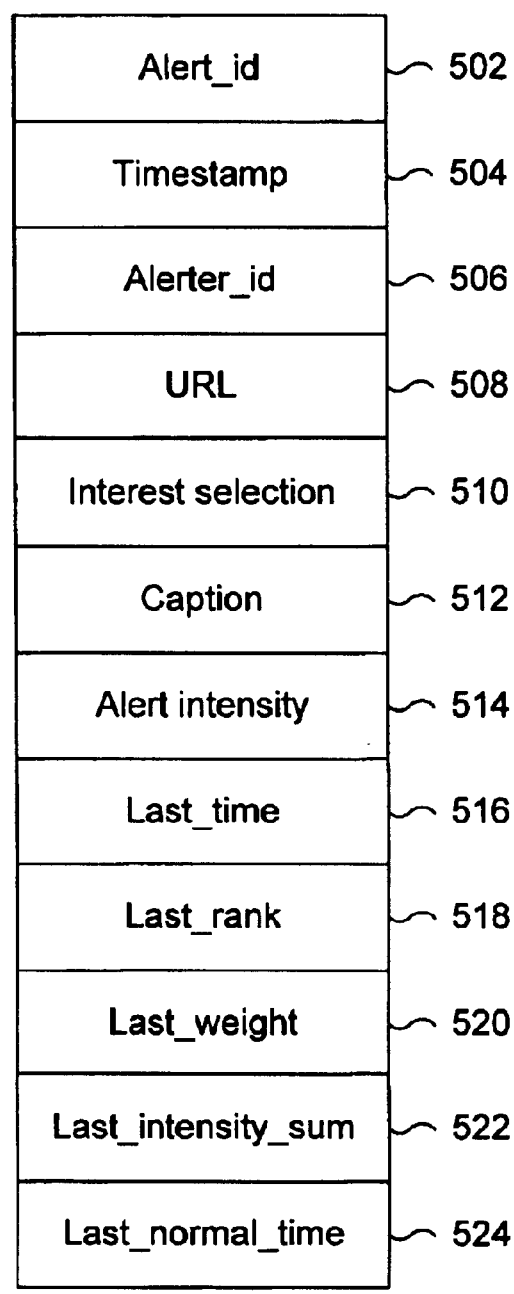
FIG. 5 is an illustration of the data structure used in one embodiment for the alert object.

FIG. 5 is an illustration of the data structure used in one embodiment for the alert object. Data field 502 is used to store the ALERT_ID described above. Data field 504 is used to store the time stamp described above. Data fields 506–512 are used to store the ALERTER_ID, URL, INTEREST SELECTION, and CAPTION described above, respectively. ALERT INTENSITY field 514 is used to store a number indicating the intensity or weight to be afforded to the incoming alert. The ALERT INTENSITY is determined as described below. The alert object also stores properties retrieved from various database tables, described more fully below. For example, the alert object includes a LAST_TIME field 516 used to store data retrieved from the database indicating the time of the most recent prior alert. The alert object also includes an LAST_RANK field 518 used to store a numerical ranking retrieved from the database that indicates the overall level or degree of current interest of an item as indicated by all of the alerts that have been submitted with respect to a URL during the current period of activity with respect to the URL through the most recent prior alert. The alert object also includes a LAST_WEIGHT field 520 used to store data retrieved from a database table, as described below, that represents the number of prior alerts received for the URL in the interest category indicated by the current alert, as described more fully below. The alert object also includes a LAST_INTENSITY_SUM field 522 in which the sum of the intensities of all prior alerts for the URL during the current period of activity with respect to the URL, which sum is retrieved from a database table described more fully below, is stored. Finally, the alert object includes a LAST_NORMAL_TIME field 524 used to store the time, retrieved from a database table as described more fully below, when the last normalization calculation was performed.

Figure 6:
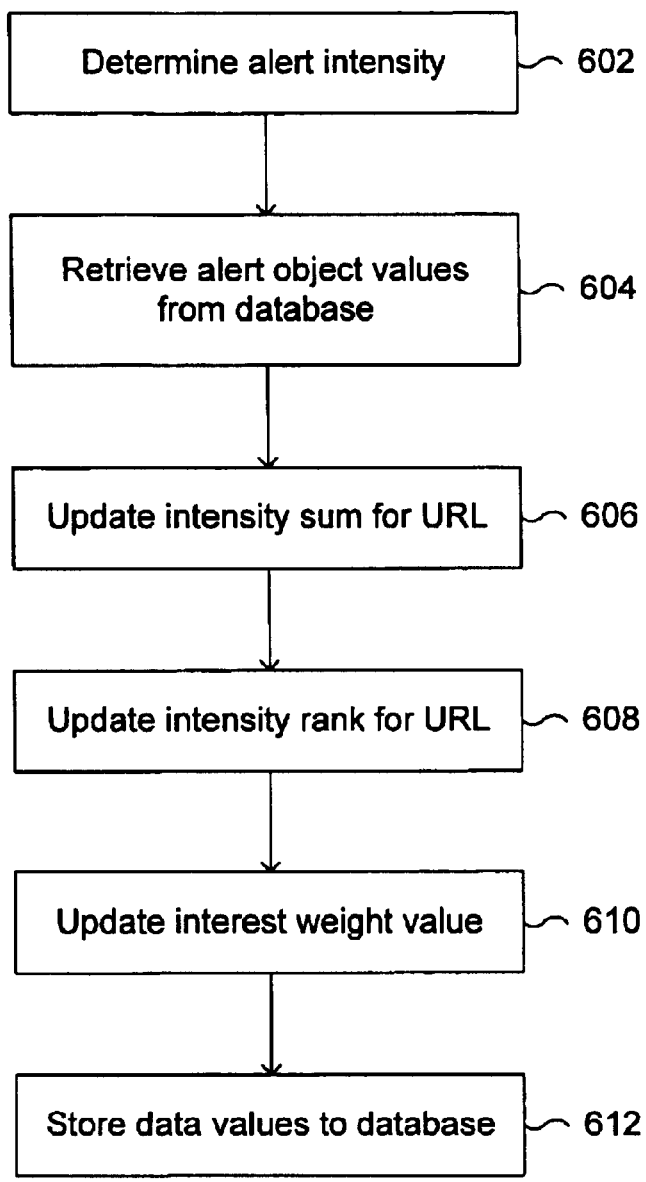
FIG. 6 is a flowchart illustrating a process used in one embodiment to process an alert, as in step 304 of FIG. 3.

FIG. 6 is a flowchart illustrating a process used in one embodiment to process an alert, as in step 304 of FIG. 3. The process begins with step 602 in which the intensity of the alert is determined. The term intensity as used herein refers to the weight or value to be assigned to a particular alert regarding an item. In one embodiment, the intensity is a value between 0 and 1. In one embodiment, the value assigned for the intensity is higher if the alerting user selects an interest category for the alert than it would have been if the same alerting party had not selected an interest category. In one embodiment, the intensity value is higher if the alerting party provides a caption for the alert than it would have been if the alerting party had not provided a caption. In one embodiment, the intensity of an alert is increased if it is determined that the alerting party is a party that has provided particularly relevant or helpful alerts in the past, or is trusted for some other reason, such as expertise, academic credentials, or reputation within a particular community of interest. In one embodiment, the intensity of an alert is decreased if it is determined that the alerting party has provided unhelpful or erroneous alerts in the past, or if it is determined that the alerting party cannot be trusted as much as other alerting parties for other reasons, such as reputation in the relevant community. In one embodiment, it is possible to provide both an active alert by selecting an alert button and to provide a passive alert by merely accessing a URL with respect to which an alerting party previously submitted an active alert. In one embodiment, an active alert is assigned a higher intensity value than a passive alert.

For example, a passive alert may be arbitrarily assigned a baseline intensity value of 0.3 and an active alert a baseline intensity value of 0.5. For an active alert, 0.1 could be added for each of the following conditions that is satisfied by the alert: an interest category selection was included in the alert; a caption was included in the alert; and/or the source of the alert is particularly trusted. Conversely, 0.1 could be subtracted from the intensity of an alert from a source known to be unreliable. Alternatively, alerts from sources known to be unreliable may be blocked and not assigned any intensity value.

The process illustrated in FIG. 6 continues with step 604 in which data values for the alert object data fields described above that are not included in the alert transmission received from the alerting party are retrieved from the database.

Next, in step 606, the intensity sum for the URL, which is the sum of the intensity values for all of the alerts with respect to the URL, is updated. Next, in step 608, the intensity rank for the URL is updated to reflect the new alert. In step 610, the interest weight value, which represents the number of alerts for a particular URL in which a particular category of interest was indicated, is updated. Finally, in step 612, the updated data values are stored to the database.

Figure 7:
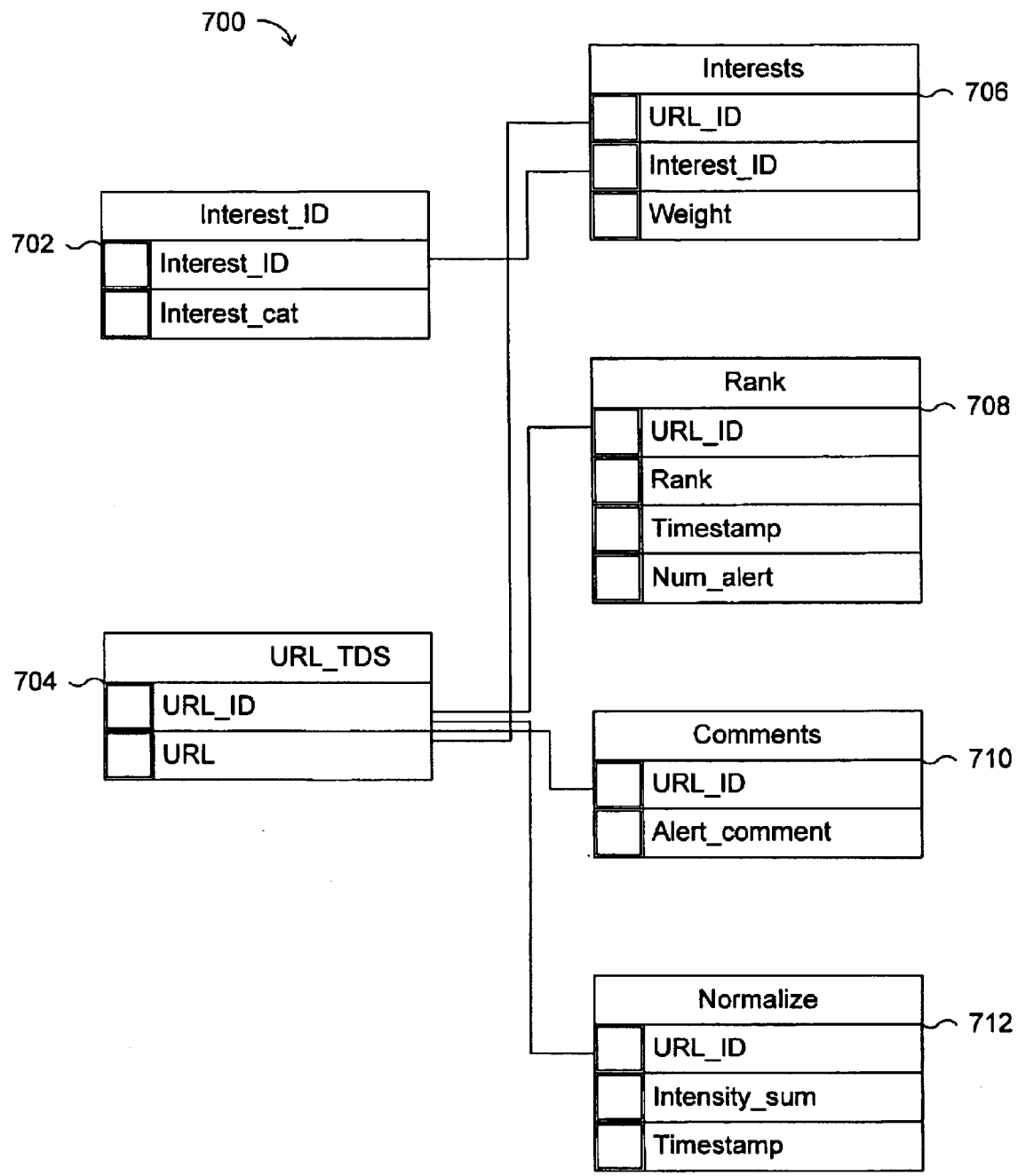
FIG. 7. Is an illustration of six database tables 700 used in one embodiment to store data concerning alerts received with respect to items of current interest associated with URLs.

FIG. 7 is an illustration of six database tables 700 used in one embodiment to store data concerning alerts received with respect to items of current interest associated with URLs. The database tables 700 include an INTEREST_ID table 702 used to provide a unique identifier, labeled INTEREST_ID in FIG. 7, for each interest category, denominated INTEREST_CAT in FIG. 7. Database tables 700 also include a URL_ID table 704 used to provide a unique identifier, labeled URL_ID in FIG. 7, for each URL.

Database tables 700 also include an INTERESTS table 706 used to store the interest weight, denominated WEIGHT in FIG. 7, for each interest category with respect to which an alert has been submitted for a URL. As noted above, in one embodiment, the weight is the total number of alerts received within a given interest category for a URL. For example, if five alerts indicating the interest category People and three alerts indicating the interest category Nature have been submitted for a URL, there will be two entries for the URL in the interest table, one for each interest category. The weight in the entry for the category People would be "5" and the weight for the URL in the category Nature would be "3".

The database tables 700 also include a RANK table 708 used to store a rank value for each URL associated with an item of current interest, a time stamp when the rank was last calculated, and a data entity denominated NUM_ALERT in FIG. 7, which represents the total number of alerts submitted for the URL.

The database tables 700 also include a COMMENTS table 710 used to store any comment submitted with an alert and to associate each comment with the corresponding URL. Finally, the database table 700 include a NORMALIZE table 712 used to store the sum of the intensities of the alerts submitted for a URL (INTENSITY$_{13}$ SUM) and a time stamp indicating when the last normalization was performed.

Figure 8A:
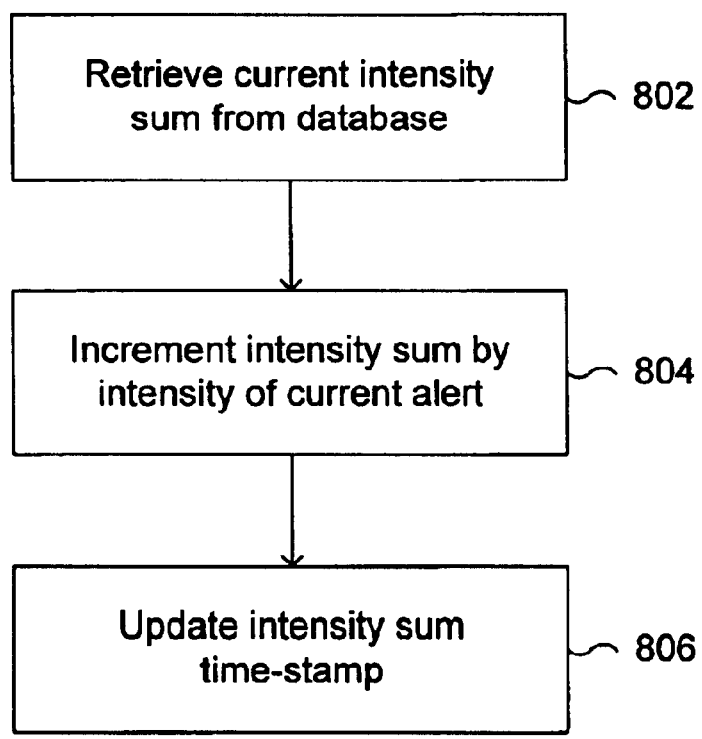
FIG. 8A is a flowchart illustrating a process used in one embodiment to update the intensity sum for a URL, as in step 606 of FIG. 6.

FIG. 8A is a flowchart illustrating a process used in one embodiment to update the intensity sum for a URL, as in step 606 of FIG. 6. The process begins with step 802 in which the current intensity sum is retrieved from the database, as in step 604 of FIG. 6. If there is no existing record for the URL in the NORMALIZE table (i.e., the alert being processed is the first alert for the URL), a URL_ID is assigned for the URL, a record for the URL is created in the NORMALIZE table, and the retrieved current intensity sum is set to zero. Next, in step 804, the intensity sum is incremented by the amount of the intensity of the current alert. For example, if the previous intensity sum was 4.7 and the intensity for the current alert was 0.5, the intensity sum would be incremented to the value of 4.7+0.5=5.2. Finally, in step 806, the intensity sum time stamp stored in NORMALIZE table 712 shown in FIG. 7 (which is the same as the LAST_NORMAL_TIME stored in field 524 of FIG. 5) is updated to the time stamp of the current alert. In one embodiment, the intensity sum is updated, and a normalization is performed as described more fully below, each time a new alert is received for a URL. In such an embodiment, the time stamp stored in the NORMALIZE table 712 of FIG. 7 will be the same as the time stamp stored in the RANK table 708 of FIG. 7, as both the rank and the intensity sum are updated each time an alert is received.

Figure 8B:
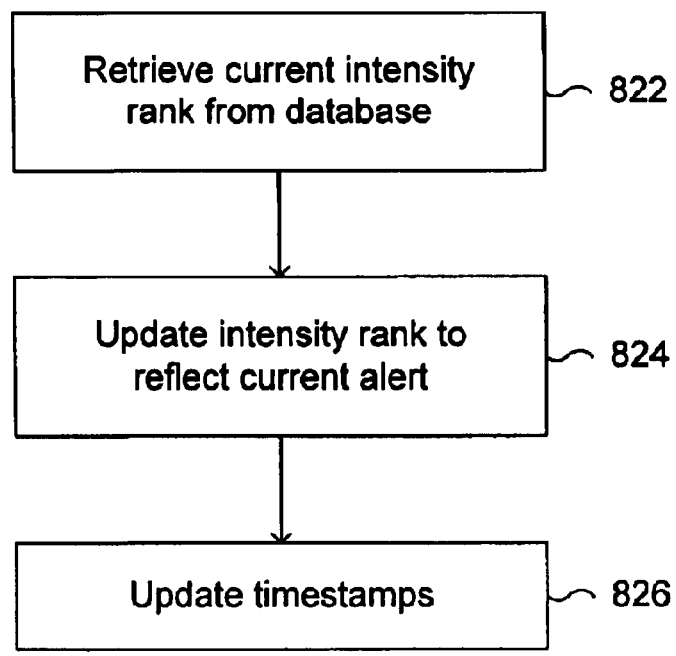
FIG. 8B is a flowchart illustrating a process used in one embodiment to update the intensity rank for a URL to reflect the intensity of the current alert.

FIG. 8B is a flowchart illustrating a process used in one embodiment to update the intensity rank for a URL to reflect the intensity of the current alert. The process begins with step 822 in which the current intensity rank is retrieved from the database, as in step 604 of FIG. 6. As shown in FIG. 7, in one embodiment, this value is retrieved from the RANK table 708. If there is no entry in the RANK table for the URL, i.e., the alert being processed is the first alert for the URL, a record in the RANK table is created for the URL (identified by the URL_ID assigned to the URL) and the current intensity rank is set to zero. Next, in step 824, the intensity rank is updated to reflect the intensity of the current alert. In one embodiment, if the current alert has been received within a predetermined time interval τ after the last alert for the URL, the updated intensity rank is a function of the last rank and the intensity of the current alert in accordance with the following formula:

$$r'=(k-r)*I_{alert}+r$$

Where k is the maximum intensity value, which as noted above is one in one embodiment, r is the last rank, r' is the updated rank, and $I_{alert}$ is the intensity value for the current alert. Restating the formula to reflect the fact that in one embodiment, the maximum intensity level k=1, the formula becomes:

$$r'=(1-r)*I_{alert}+r$$

If an alert is the first alert received for a URL, the last rank is considered to be zero (r=0) and the above formula results in the new rank being equal to the intensity value for the current alert. For example, if the intensity value for the current alert is 0.5, the updated heat rank r'=(1−0)*0.5+0= 0.5. If a subsequent alert of intensity 0.6 is received, the formula results in the updated intensity rank being calculated as follows:

$$r'=(1-0.5)*0.6+0.5=0.8$$

As the example illustrates, so long as additional alerts are received within the time interval each incoming alert will cause the intensity rank for the URL to increase until the intensity rank approaches the maximum intensity value k (in the example, the rank would approach k=1). The speed with which the intensity rank for a particular URL approaches the maximum value k depends on the intensity value of the incoming alerts and the frequency with which alerts are received.

In one embodiment, if the predetermined time interval τ referred to above has expired between the last alert and the current alert, the updated intensity rank is calculated by a modified formula which reduces the updated intensity rank in accordance with an exponential decay function that effectively adjusts the updated intensity rank downward to account for the passage of time between the last alert and the current alert. All other things being equal, this adjustment would result in a site that received alerts more frequently to have a higher rank than a site that received alerts separated by more than the predetermined time interval. To determine the updated intensity rank as adjusted for the passage of time, the following formula is used in one embodiment:

$$r'=[(k-r)*I_{alert}+r]*e^{-a(\Delta t-\tau)}.$$

In this formula, k, r, and $I_{alert}$ are the same as above, a is the weight assigned to the decay function (a higher value for a will result in a greater amount of decay per unit time), $\Delta t$ is the amount of time that has elapsed between the current alert and the previous alert, and τ is the predetermined time interval referred to above.

In one embodiment, the updated intensity rank is normalized by multiplying the updated intensity rank by two factors. The first factor is a low frequency enhancement factor designed to enhance the intensity rank of URLs with respect to which alerts are received relatively less frequently relative to the intensity rank of URLs regarding which alerts are received more frequently. The purpose of this enhancement factor is to ensure that sites that are of current interest only from time to time are not masked by the intensity ranking calculated for sites that are of current interest more frequently. In one embodiment, the low frequency enhancement factor is the time of the current alert minus the time of the last update to the intensity rank.

The second factor by which the updated intensity rank is multiplied is a low volume enhancement factor The purpose of this factor is to ensure that the intensity rank of URLs that are of current interest only to a smaller community of users will not be overshadowed by the intensity rank of URLs that are of current interest to a large community. In one embodiment, the low volume enhancement factor is the inverse of the intensity sum for the URL. Accordingly, in one embodiment, the normalized intensity rank is determined by the following formula:

$$r''=r'*(t_{current}-t_{first})*1/n$$

Where r''=normalized intensity rank
r'=updated intensity rank before normalization
$t_{current}$=timestamp of current alert
$t_{first}$=timestamp of first alert for URL
n=intensity sum=sum of all alert intensities for URL Once the intensity rank has been updated and normalized, the process shown in FIG. 8B continues with step 826 in which the time stamps for the normalization and intensity rank tables are updated to the time stamp of the current alert.

Figure 8C:
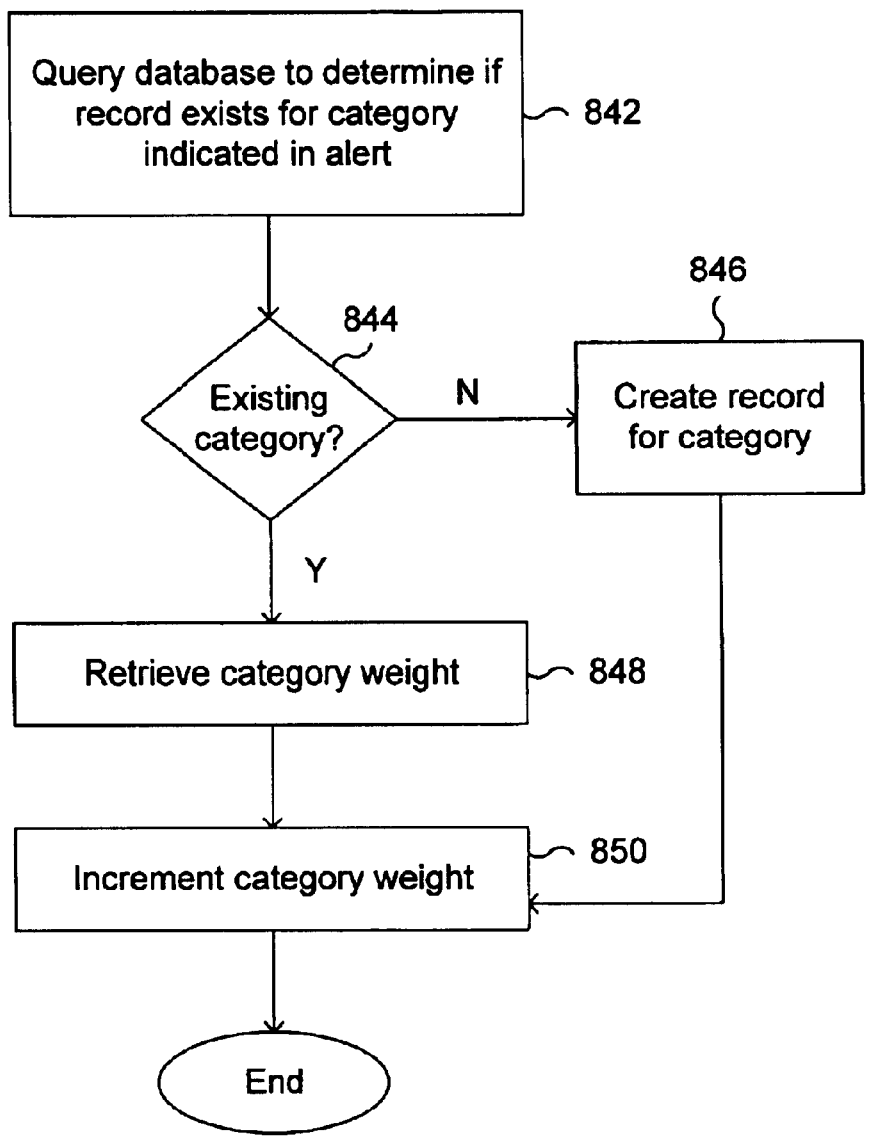
FIG. 8C is a flowchart illustrating a process used in one embodiment to update the interest category weight for a URL with respect to the interest category indicated in an alert.

FIG. 8C is a flowchart illustrating a process used in one embodiment to update the interest category weight for a URL with respect to the interest category indicated in an alert. The process begins with step 842 in which the database is queried to determine if a record exists for the URL for the interest category indicated in the alert. In step 844, it is determined whether the query performed in step 842 identified an existing database table entry for the URL for the interest category indicated in the alert (i.e., whether a prior alert indicated the same interest category for the URL). If it is determined in step 844 that a database entry does not exist for the interest category with respect to the URL, the process proceeds to step 846 in which a record in the INTEREST table is created for the URL with respect to the interest category of the alert. The process then proceeds to step 850 in which the weight value is incremented for the URL with respect to the interest category by increasing the value from zero to one for the new record.

If it is determined in step 844 that there is an existing record for the interest category for the alert with respect to the alert URL, the process proceeds to step 848 in which the weight value stored in the record is retrieved. The process then continues to step 850 in which the retrieved weight is incremented by one to reflect the current alert. For example, if the retrieve weight were 7, the weight would be incremented to 8 in step 850 to reflect the current alert.

Figure 9:
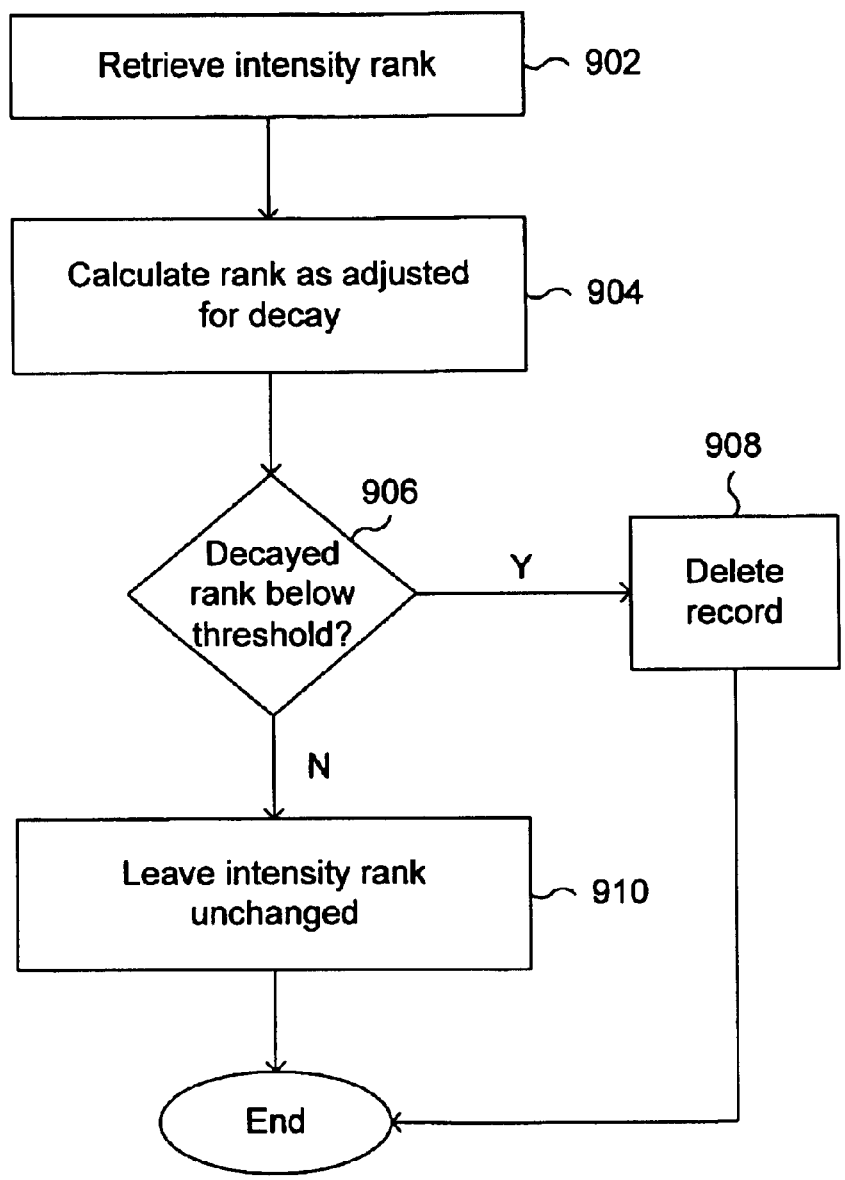
FIG. 9 is a flowchart illustrating a process used in one embodiment to purge records for URLs that are determined to be no longer of current interest by calculating a time decayed intensity rank at intervals, even if no new alert has been received, and purging from the database the records for a URL if the time decayed intensity rank is below a prescribed threshold.

FIG. 9 is a flowchart illustrating a process used in one embodiment to purge records for URLs that are determined to be no longer of current interest by calculating a time decayed intensity rank at intervals, even if no new alert has been received, and purging from the database the records for a URL if the time decayed intensity rank is below a prescribed threshold. The process shown in FIG. 9 begins with step 902 in which the intensity rank for a URL is retrieved. In one embodiment, the intensity rank is retrieved and process shown in FIG. 9 is performed, at a predetermined arbitrary time interval τ.

The process shown in FIG. 9 continues with step 904 in which an intensity rank adjusted for time decay is calculated for the URL. In one embodiment, the time decayed intensity rank is determined by the following formula:

$$r_t=e^{-\alpha(\Delta t-\tau)}*r$$

Where
$r_t$=time decayed intensity rank
a=weight of decay function
$\Delta$=time elapsed since last alert
τ=predetermined time interval referred to above
r=stored intensity rank As can be seen from the above formula, the time decayed intensity rank decays exponentially over time if no new alerts are received. If it is determined in step 906 of the process shown in FIG. 9 that the time decayed intensity rank is below the intensity rank threshold, the process proceeds to step 908 in which the record for the URL is deleted. If it is determined in step 906 that the time decayed intensity rank is not below the intensity rank threshold, the process proceeds to step 910 in which the intensity rank as stored in the database is left unchanged.

Figure 10:
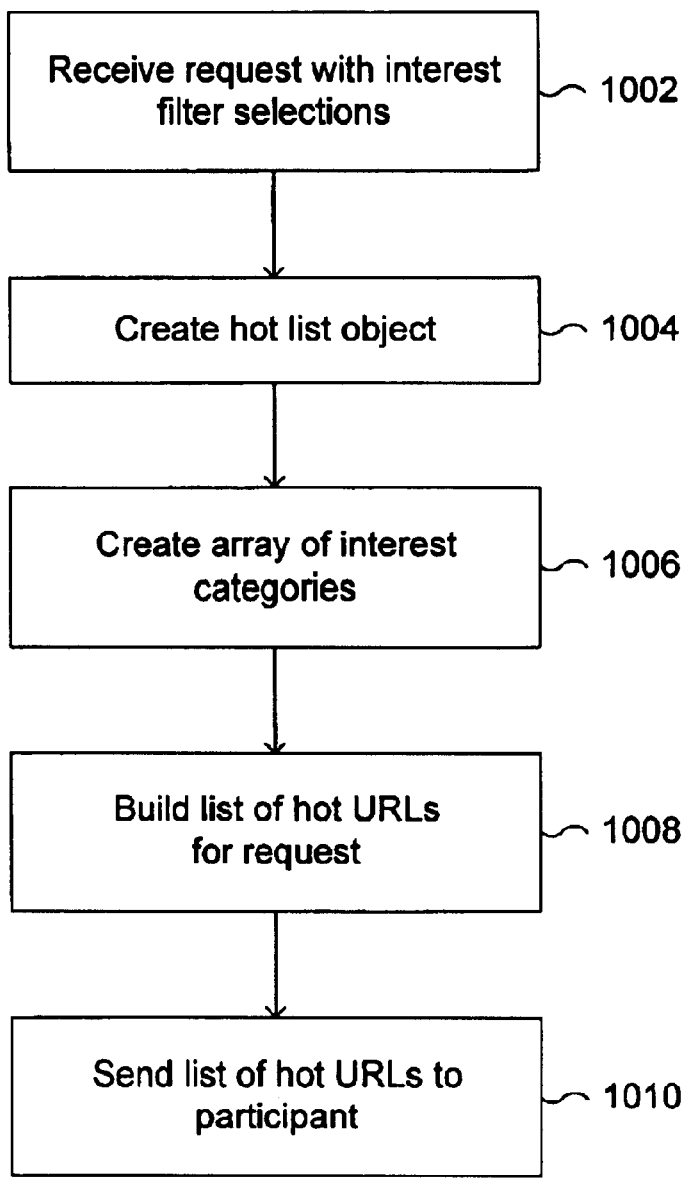
FIG. 10 is a flowchart illustrating a process used in one embodiment to disseminate an alert to a participant, as in step 306 of FIG. 3.

FIG. 10 is a flowchart illustrating a process used in one embodiment to disseminate an alert to a participant, as in step 306 of FIG. 3. The process begins with step 1002 in which a request containing interest category filter selections made by the participant is received. Next, in step 1004, a hot list software object is created at the application server, as shown in FIG. 1 and described above. Then, in step 1006, an array of interest categories, such as the interest category array 114 described above with respect to FIG. 1, is created within the hot list object. Next, in step 1008, a list of hot URLs responsive to the request is built. Finally, in step 1010, the list of hot URLs responsive to the request is sent to the participant.

Figure 11:
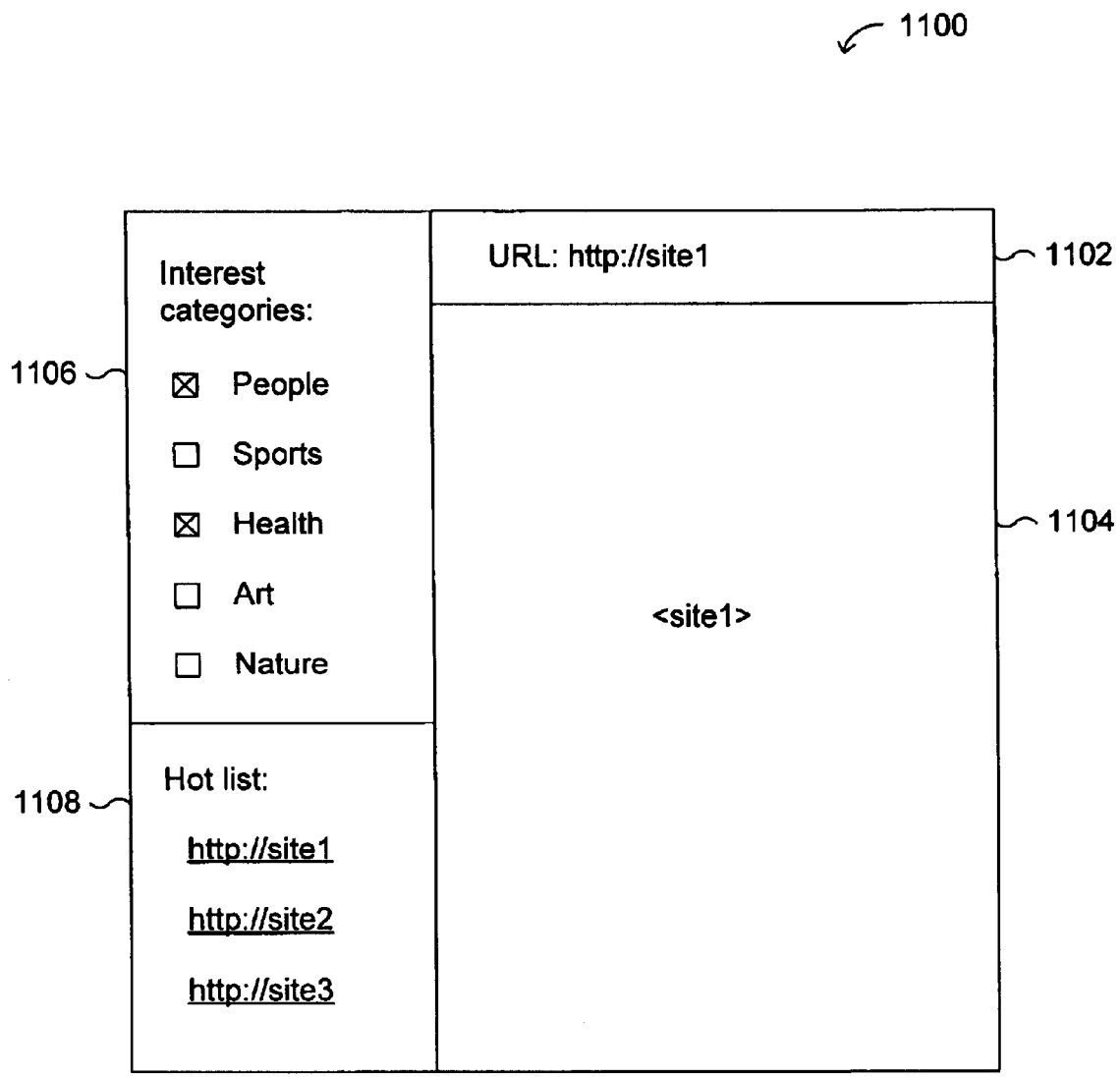
FIG. 11 shows an exemplary participant display 1100 used in one embodiment to disseminate alert information to a participant.

FIG. 11 shows an exemplary participant display 1100 used in one embodiment to disseminate alert information to a participant. The display 1100 includes a URL entry and display area 1102. The URL for the web content or other electronic resource currently being accessed by the participant is displayed in the URL entry and display area 1102, and the participant may enter the URL for the web content or other electronic resource the participant wishes to access manually in the URL entry and display area 1102, as in the URL or address field for a World Wide Web browser. The display 1100 also includes a content display area 1104 in which the web or other content for the URL listed in URL entry and display area 1102 is displayed. For example, if the URL is the URL of web content accessed via the Internet, the web content associated with the URL will be displayed in URL display area 1104.

The display 1100 also includes an interest category filter selection area 1106 in which interest categories are listed along with a check box for each category listed. The participant selects the check box for each interest category for which the participant would like URLs of current interest to be included in the participant's hot list.

In one embodiment, filter selection area 1106 includes for each category a sensitivity entry area (not shown in FIG. 11) to be used to provide an indication of the participant's degree or level of interest. For example, in one embodiment a participant may enter a whole number from 1 to 5, with 1 indicating the lowest level of sensitivity (e.g., the participant does not want to receive a notification regarding a URL in the category unless a significant number of alerts have been received regarding the URL, or only when the intensity rank for the URL exceeds a predetermined, relatively high threshold) and 5 representing the highest level of sensitivity (e.g., the participant wants to receive a notification even if there has only been one or relatively few alerts concerning a URL, or if one or more alerts have been received but the intensity rank for the URL is relatively low).

In one embodiment, a request is sent to the application server automatically at predetermined intervals. The request contains the interest categories that are in the selected state at the time the request is sent. In one embodiment, the display 1100 includes a submit button (not shown in FIG. 11) that, when selected, causes a request containing the interest categories selected by the participant at the time to be posted to the application server via the Internet.

The display 1100 also includes a hot list display area 1108 in which the hot list of URLs returned by the system to the participant in response to a request is presented. As shown in FIG. 11, in one embodiment, each URL is represented by a hypertext link that, when selected, causes the URL of the listed cite to appear in the URL entry and display area 1102 and the content associated with the URL to be displayed in the URL display area 1104.

In one embodiment, the display 1100 is modified to include an alert submission display area such as the alert submission display shown in FIG. 2A. This would permit a participant to send an active alert to the application server if the participant encounters a URL of current interest.

Figure 12:
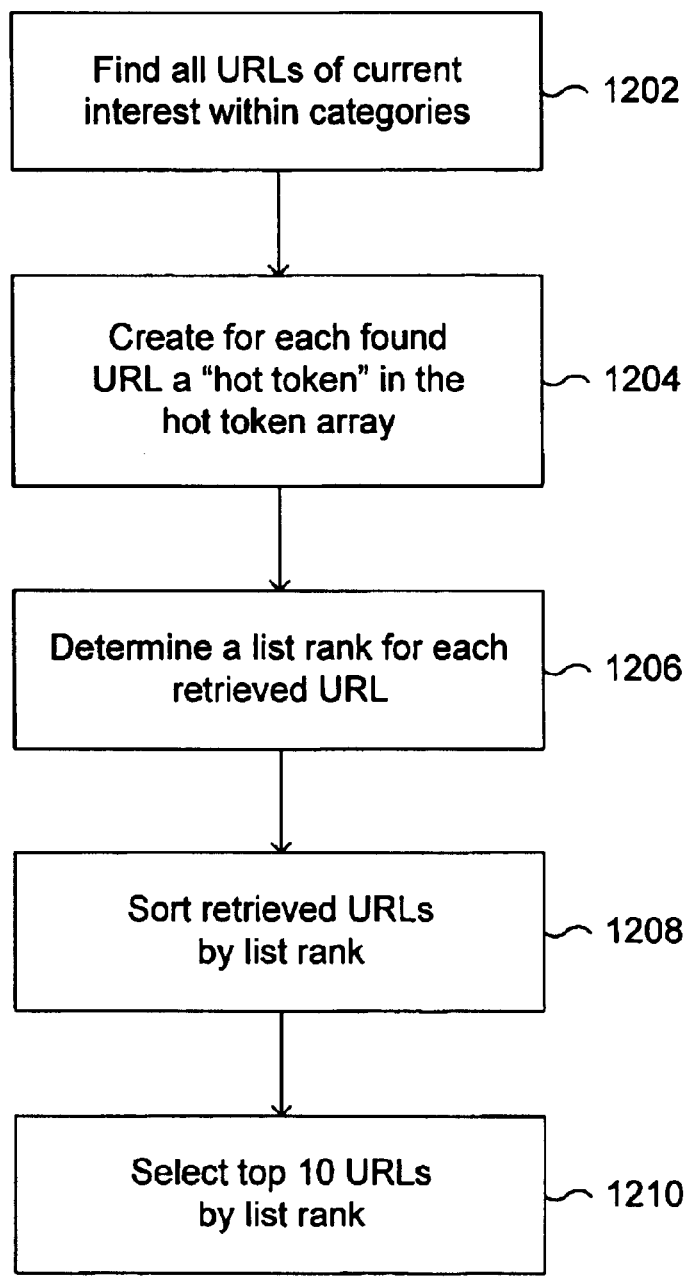
FIG. 12 is a flowchart illustrating a process used in one embodiment to build a list of hot URLs responsive to a request, as in step 1008 of FIG. 10.

FIG. 12 is a flowchart illustrating a process used in one embodiment to build a list of hot URLs responsive to a request, as in step 1008 of FIG. 10. The process begins with step 1202 in which all URLs of current interest within the categories indicated in the request are found.

Next, in step 1204, a "hot token" object is created in a hot token array within the hot list object for each URL found in step 1202, as described above with respect to hot token array 116 shown in FIG. 1. Each hot token object holds the URL_ID, the WEIGHT for the URL with respect to the interest category indicated in the request, the sum of the WEIGHT values for each category associated with the URL in the database, and the intensity rank (RANK) for the URL.

Next, in step 1206, a list rank is determined for each URL retrieved in response to the request. In one embodiment, a list rank value is calculated for each URL and is used to determine the list rank (or the order in which the responsive URLs will be placed to determine which URLs will be provided). In one embodiment, an initial list rank value is calculated for each URL based on the interest category weight(s) for the URL with respect to the interest category or categories in the request, along with the interest weight for any interest category or categories that are associated with the URL in the database but which are not among the categories indicated in the request. In one embodiment, the initial list rank value "v" of a URL number "n" ($v_n$) is calculated according to the following formula:

$$v_n = \frac{\Sigma \sqrt{f_k}}{\Sigma \sqrt{f_m}}$$

Where $v_n$ initial list rank value of URL "n"
$f_k$=interest weight for URL for each request category
$f_m$=interest weight for each category associated with URL in database For example, if at the time of the request there had been ten alerts submitted for a particular URL and three of the alerts were associated with a first category, two with a second category and five with a third category, and if a request were received that included among the request categories the first and third categories, the initial list rank value "v" for URL number "n" calculated in accordance with the above formula would be as follows:

$$v_n = \frac{\sqrt{3} + \sqrt{5}}{\sqrt{3} + \sqrt{2} + \sqrt{5}} \approx 0.74$$

It should be noted that the use of the square root of the weight for each category tends to give relatively greater effect to the weight of interest categories associated with the URL by a minority of alerting users because using the square root reduces the net effect of the greater weight value associated with interest categories indicated by the majority of alerting users. As with the normalization of the intensity rank described above, this has the effect of giving more visibility to matters of interest to a relatively smaller community.

In an embodiment in which the participant indicates a level of sensitivity with respect to each selected interest category, as described above, the formula for the initial list rank value is modified to take into consideration the sensitivity "s" indicated for each category of interest. In one embodiment, the initial list rank value formula is modified as follows:

$$v_n = \frac{\Sigma\sqrt{s_k * f_k}}{\Sigma\sqrt{s_m * f_m}}$$

Where $v_n$=initial list rank value of URL "n"
$f_k$=interest weight for URL for each request category
$f_m$=interest weight for each category associated with URL in database
$s_k$=sensitivity indicated for request category "k"
$s_m$=sensitivity indicated for request category corresponding to interest category "m", if any ($s_m$=1 for interest categories not in request).

For example, in the example described above, assume the participant indicated a sensitivity level of 1 with respect to the first category and 5 with respect to the third category, the initial list rank value would be calculated as follows:

$$v_n = \frac{\sqrt{1*3} + \sqrt{5*5}}{\sqrt{1*3} + \sqrt{1*2} + \sqrt{5*5}} \approx 0.83$$

(As noted above, the sensitivity level $s_m$ used for the second category, having weight "2" in the denominator, is set at "1" because in the example the participant did not select that category.)

The initial list rank value determined by this calculation (0.83) is greater than the initial list rank value found in the above calculation of an initial list rank value in an embodiment in which sensitivity levels are not assigned or considered (0.74). This illustrates the effect of assigning sensitivity levels. The initial list rank value determined in the second calculation, which takes into account a sensitivity level for each category, is higher than it would have been found to be without regard to sensitivity because the participant indicated a higher sensitivity for one of the categories with respect to which alerts had been received for the URL.

In this way, high-sensitivity users are more likely to become aware of and access a URL with respect to which one or more alerts have been received in a category for which the user has indicated a high sensitivity. If such a high-sensitivity users chose to send alerts of their own with respect to the URL, such activity would increase the intensity rank for the URL (as described above) and would tend to propagate the original alert or alerts to lower-sensitivity users (because the intensity rank is factored into the final list rank used to identify the final list of URLs to be provided to a participant, as described below). If such lower-sensitivity users were to send even more alerts, the original alerts would be further propagated to even lower-sensitivity users, and so on.

In one embodiment, the initial list rank value determined by the interest category weights, as described above, is used along with the intensity rank for the URL to calculate a final list rank value for the URL. In one embodiment, the final list rank value for URL number "n" is calculated in accordance with the following formula:

$$v_n' = r_n (\alpha + (1-\alpha)v_n)$$

Where
$v_n'$=final list rank value
$r_n$=intensity rank for URL
$\alpha$=weight factor ($0 \leq \alpha \leq 1$)
$v_n$=initial list rank value In the above equation, the weight factor a determines the relative weight afforded to the intensity rank for the URL and the initial list rank calculated based on the interest category weights as described above. If the value for a is selected to be 1, the final list rank would be equal to the intensity rank for the URL and the initial list rank would not factor into the final list rank at all. Therefore, a higher weight factor will tend to increase the influence of the intensity rank for the URL and decrease the effect of the initial list rank. Stated another way, a low weight factor tends to give more effect to the extent to which the interest categories associated with the URL in the database match the interest categories indicated in the request from the participant. Conversely, a higher weight factor tends to give greater effect to the overall popularity of the URL as measured by the intensity rank.

Once the list rank for each retrieved URL has been calculated in step 1206, in step 1208 the retrieved URLs are sorted by list rank. Then, in step 1210, the top ten URLs by list rank are selected as the hot list of URLs to be sent to the participant in response to the request. The number ten is an arbitrary number and either a fewer number or greater number of URLs may be included.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for normalizing a measure of the level of current interest of an item that is based on indications of interest received from one or more users of a network via which the item is accessible, comprising:

determining for each successive indication of interest received with respect to the item an intensity value;

calculating at the time each successive indication of interest with respect to the item is received an intensity rank based at least in part on the intensity value of the received indication; and multiplying the calculated intensity rank by a normalization factor to determine a normalized intensity rank;

wherein the normalization factor includes a low frequency enhancement factor that enhances, relative to the intensity rank for items for which indications of current interest are received more frequently, the intensity rank for an item for which indications of current interest are received less frequently; and wherein the low frequently enhancement factor is the difference between the time of the received indication and the time of the last-received indication.

2. A method for normalizing a measure of the level of current interest of an item that is based on indications of interest received from one or more users of a network via which the item is accessible, comprising:

determining for each successive indication of interest received with respect to the item an intensity value;

calculating at the time each successive indication of interest with respect to the item is received an intensity rank based at least in part on the intensity value of the received indication; and multiplying the calculated intensity rank by a normalization factor to determine a normalized intensity rank;

wherein the normalization factor includes a low volume enhancement factor that enhances, relative to the intensity rank for items for which a greater number of indications of current interest are received, the intensity rank for an item for which fewer indications of current interest are received; and wherein the low volume enhancement factor is the inverse of the sum of the intensity values for all indications of interest received with respect to the item.

3. A system for normalizing a measure of the level of current interest of an item that is based on indications of interest received from one or more users of a network via which the item is accessible, comprising:

a computer configured to determine for each successive indication of interest received with respect to the item an intensity value; calculate at the time each successive indication of interest with respect to the item is received an intensity rank based at least in part on the intensity value of the received indication; and multiplying the calculated intensity rank by a normalization factor to determine a normalized intensity rank; and a database, associated with the computer, configured to store data relating to the item;

wherein the normalization factor includes a low frequency enhancement factor that enhances, relative to the intensity rank for items for which indications of current interest are received more frequently, the intensity rank for an item for which indications of current interest are received less frequently; and wherein the low frequently enhancement factor is the difference between the time of the received indication and the time of the last-received indication.

4. A computer program product for normalizing a measure of the level of current interest of an item that is based on indications of interest received from one or more users of a network via which the item is accessible, the computer program product being embodied in a computer readable medium and comprising computer instructions for:

determining for each successive indication of interest received with respect to the item an intensity value;

calculating at the time each successive indication of interest with respect to the item is received an intensity rank based at least in part on the intensity value of the received indication; and multiplying the calculated intensity rank by a normalization factor to determine a normalized intensity rank;

wherein the normalization factor includes a low frequency enhancement factor that enhances, relative to the intensity rank for items for which indications of current interest are received more frequently, the intensity rank for an item for which indications of current interest are received less frequently; and wherein the low frequently enhancement factor is the difference between the time of the received indication and the time of the last-received indication.

5. A system for normalizing a measure of the level of current interest of an item that is based on indications of interest received from one or more users of a network via which the item is accessible, comprising:

a computer configured to determine for each successive indication of interest received with respect to the item an intensity value; calculate at the time each successive indication of interest with respect to the item is received an intensity rank based at least in part on the intensity value of the received indication; and multiplying the calculated intensity rank by a normalization factor to determine a normalized intensity rank; and a database, associated with the computer, configured to store data relating to the item;

wherein the normalization factor includes a low volume enhancement factor that enhances, relative to the intensity rank for items for which a greater number of indications of current interest are received, the intensity rank for an item for which fewer indications of current interest are received; and wherein the low volume enhancement factor is the inverse of the sum of the intensity values for all indications of interest received with respect to the item.

6. A computer program product for normalizing a measure of the level of current interest of an item that is based on indications of interest received from one or more users of a network via which the item is accessible, the computer program product being embodied in a computer readable medium and comprising computer instructions for:

determining for each successive indication of interest received with respect to the item an intensity value;

calculating at the time each successive indication of interest with respect to the item is received an intensity rank based at least in part on the intensity value of the received indication; and multiplying the calculated intensity rank by a normalization factor to determine a normalized intensity rank;

wherein the normalization factor includes a low volume enhancement factor that enhances, relative to the intensity rank for items for which a greater number of indications of current interest are received, the intensity rank for an item for which fewer indications of current interest are received; and wherein the low volume enhancement factor is the inverse of the sum of the intensity values for all indications of interest received with respect to the item.

* * * * *